(12) United States Patent
Blumenau

(10) Patent No.: US 6,253,273 B1
(45) Date of Patent: Jun. 26, 2001

(54) LOCK MECHANISM

(75) Inventor: Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/020,048

(22) Filed: Feb. 6, 1998

(51) Int. Cl.$^7$ ............................. G06F 12/00; G06F 12/14
(52) U.S. Cl. ................. 710/200; 710/36; 710/56; 710/57; 710/108; 710/109; 710/119; 710/220; 711/147; 711/148; 711/149; 711/150; 711/151; 711/152; 711/153; 711/114; 711/164; 709/104; 709/226
(58) Field of Search ............................. 710/200, 56, 109, 710/220, 119, 108, 36, 240, 57; 709/226, 104; 711/147–153, 114, 164; 713/300

(56) References Cited

U.S. PATENT DOCUMENTS

| | | | |
|---|---|---|---|
| 5,140,685 | * | 8/1992 | Sipple et al. ........................... 711/164 |
| 5,146,564 | * | 9/1992 | Evans et al. ............................. 710/57 |
| 5,269,009 | * | 12/1993 | Herzl et al. ........................... 711/164 |
| 5,276,847 | * | 1/1994 | Kohn ..................................... 395/425 |
| 5,375,217 | * | 12/1994 | Jibbe et al. ........................... 395/425 |
| 5,418,962 | * | 5/1995 | Bodin et al. ........................... 395/700 |
| 5,586,331 | * | 12/1996 | Levenstein ............................. 710/200 |
| 5,675,284 | * | 10/1997 | Sgrignoli ............................... 329/360 |
| 5,689,678 | * | 11/1997 | Stallmo et al. ....................... 711/114 |
| 5,721,943 | * | 2/1998 | Johnson ................................. 713/300 |
| 5,742,830 | * | 4/1998 | Elko et al. ............................. 710/240 |
| 5,809,539 | * | 9/1998 | Sakakibara et al. .................. 711/151 |
| 5,832,297 | * | 11/1998 | Ramagopal et al. ..................... 710/5 |
| 5,845,147 | * | 12/1998 | Vishlitzky et al. ....................... 710/5 |
| 5,931,919 | * | 8/1999 | Thomas et al. ........................ 709/303 |
| 5,933,825 | * | 8/1999 | McClaughry et al. .................... 707/8 |
| 5,940,826 | * | 8/1999 | Heideman et al. ....................... 707/8 |
| 5,987,550 | * | 11/1999 | Shagam ................................. 710/119 |

* cited by examiner

Primary Examiner—Ayaz Sheikh
Assistant Examiner—Frantz B. Jean
(74) Attorney, Agent, or Firm—Fish & Richardson P.C.

(57) ABSTRACT

A method of providing a lock to a requester, the method including the steps of storing a lock indicator at a storage location on a storage medium; receiving a lock command from a requester on a host computer, wherein the lock command identifies the storage location on the storage medium and represents a lock request; in response to receiving the lock command, retrieving the lock indicator from the storage medium; performing an exclusive OR operation on the lock request and the retrieved lock indicator to produce a lock request result; and sending an indication back to the host computer indicating whether the lock request was granted.

13 Claims, 4 Drawing Sheets

| STATE | DISK DATA | NEW DATA IN BUFFER | OLD DATA IN BUFFER | DATA RETURNED |
|---|---|---|---|---|
| 0 | ∅ | — | — | — |
| 1 | ∅ | 1 | — | — |
| 2 | ∅ | 1 | ∅ | — |
| 3 | ∅ | 1 XOR ∅ | ⟹ 1 |
| 4 | 1 | 1 | ∅ | 1 |

FIG. 2a

| STATE | DISK DATA | NEW DATA IN BUFFER | OLD DATA IN BUFFER | DATA RETURNED |
|---|---|---|---|---|
| 0 | 1 | — | — | — |
| 1 | 1 | 1 | — | — |
| 2 | 1 | 1 | 1 | — |
| 3 | 1 | 1 XOR 1 | ⟹ ∅ |
| 4 | 1 | 1 | 1 | ∅ |

FIG. 2b

|        | BIT 7 | BIT 6 | BIT 5 | BIT 4 | BIT 3 | BIT 2 | BIT 1 | BIT 0 |
|--------|-------|-------|-------|-------|-------|-------|-------|-------|
| BYTE 0 | OPERATION CODE (38h) ||||||||
| BYTE 1 | LOGICAL UNIT NUMBER ||| RESERVED || MODE |||
| BYTE 2 | BUFFER ID ||||||||
| BYTE 3 | (MSB) |||||||  |
| BYTE 4 | BUFFER OFFSET ||||||| |
| BYTE 5 |        |||||||(LSB) |
| BYTE 6 | (MSB) |||||||  |
| BYTE 7 | PARAMETER LIST LENGTH ||||||| |
| BYTE 8 |        |||||||(LSB) |
| BYTE 9 | CONTROL BYTE ||||||||

FIG. 4

LOCK MECHANISM

BACKGROUND OF THE INVENTION

The invention relates generally to global locking mechanisms for controlling computer access to shared resources and more particularly to a locking mechanism that is implemented within a data storage system.

Often, when resources are shared by multiple users, e.g multiple applications running on a single host processor or multiple host processors, there must be some way of preventing more than one such user to access that resource at any one time. The shared resources can be almost any resource that might be needed by multiple users including, for example, memory, a data structure within memory, printers, communication devices, etc. Typically, access control for such a shared resource is accomplished through a locking mechanism, which may be very simple, as in the case of semaphore locks, or it may be very complex as in the case of systems which also provide deadlock detection, automatic release, and other features. The semaphore lock can be implemented by a flag stored in a predetermined storage location. If the flag is set, that means one of the users has acquired the semaphore and the relevant shared resource is not available. If the flag is cleared, that means no other user has acquired the semaphore and the requester can acquire the semaphore and access the shared resource.

Generally, such a locking mechanism must be implemented on a device that is also shared, or at least accessible, by all of the users that might need access to the shared resource to which access is being controlled. For example, in the case of multiple host computers connected to an intelligent data storage system, such as an integrated cache disk array system, the locking mechanism resides in shared memory within the data storage system. To obtain the semaphore for a resource, the requester (e.g. one of the host computers) must send an appropriate command to the data storage system over the communication channel linking the two together. Since the resource may not be available when requested, the user must wait a preselected period of time and try again, repeating this process (i.e., polling) until a lock is obtained. To reduce latency, i.e., time between when a lock is freed up and when another user gets the lock, the polling must be at a relatively high frequency e.g. 100 per second. During periods of high activity, such high polling rates can saturate the channel thereby seriously degrading the performance of the overall system. Furthermore, the high polling rate may build up the queue of I/O requests on the host computer side of the channel. Even though a resource might have become free and acquired early on, all of the remaining queued requests still must be serviced and answered.

One approach to addressing this problem has been to dedicate a separate channel for the lock requests. Thus, saturating that channel does not cut into the resources available for exchanging data between the host computer and the data storage system. But, of course, that approach has the disadvantage of eliminating that dedicated channel as a resource for exchanging data with the data storage system.

SUMMARY OF THE INVENTION

In general, in one aspect, the invention is a method of providing a lock to a requester. The method includes the steps of storing a lock indicator at a storage location on a storage medium; receiving a lock command from a requester on a host computer, wherein the lock command identifies the storage location on the storage medium and represents a lock request; in response to receiving the lock command, retrieving the lock indicator from the storage medium; performing an exclusive OR operation on the lock request and the retrieved lock indicator to produce a lock request result; and sending an indication back to the host computer indicating whether the lock request was granted.

In preferred embodiments, the method further includes the step of writing the lock request result to the storage location in the storage medium. Also, the method includes the steps of, in response to receiving the lock command, repeatedly polling the storage location on the storage medium for the indication that the lock request was granted.

In general, in another aspect, the invention is a data storage device configured to provide to an application that is running on a host computer connected to the data storage device a global locking mechanism for a resource. The device includes a data storage medium which during use stores a lock indicator for said resource; means for receiving a lock command from the host computer, the lock command representing a lock request; means for generating a lock request result in response to the lock command, the generating means including means for performing an exclusive OR operation on the lock request and the lock indicator to produce the lock request result; and means for sending the lock request result back to the host computer.

Preferred embodiments include the following features. The generating means further includes means for retrieving the lock indicator from the data storage medium; and means for repeatedly performing a polling cycle during which generation means first retrieves the lock indicator and then performs the exclusive OR operation. Also, the lock command includes an address of a storage location and wherein the generating means further includes a means for retrieving the lock indicator from the storage location. The lock command also includes a count parameter and the polling means repeatedly performs the polling cycle until either the lock request result indicates that the lock has been granted or until the number of cycles equals the count parameter at which time the sending means is caused to send the lock request result to the host computer.

One advantage of the invention is that it eliminates the large volume of I/O that is required to implement global locks on some of today's data storage systems. Also, with the invention, the polling function is moved down to the data storage system and thus it avoids saturating the channel.

The invention also opens up application level locking, as opposed to the computer level locking which is currently available.

Other advantages and features will become apparent from the following description of the preferred embodiment and from the claims.

BRIEF DESCRIPTION OF THE DRAWINGS

FIGS. 2a and 2b are tables showing the changes in the state of data in response to a lock request;

FIG. 4 is the command descriptor block (CDB) for the WRITE BUFFER command.

DESCRIPTION OF THE PREFERRED EMBODIMENTS

Figure 1:
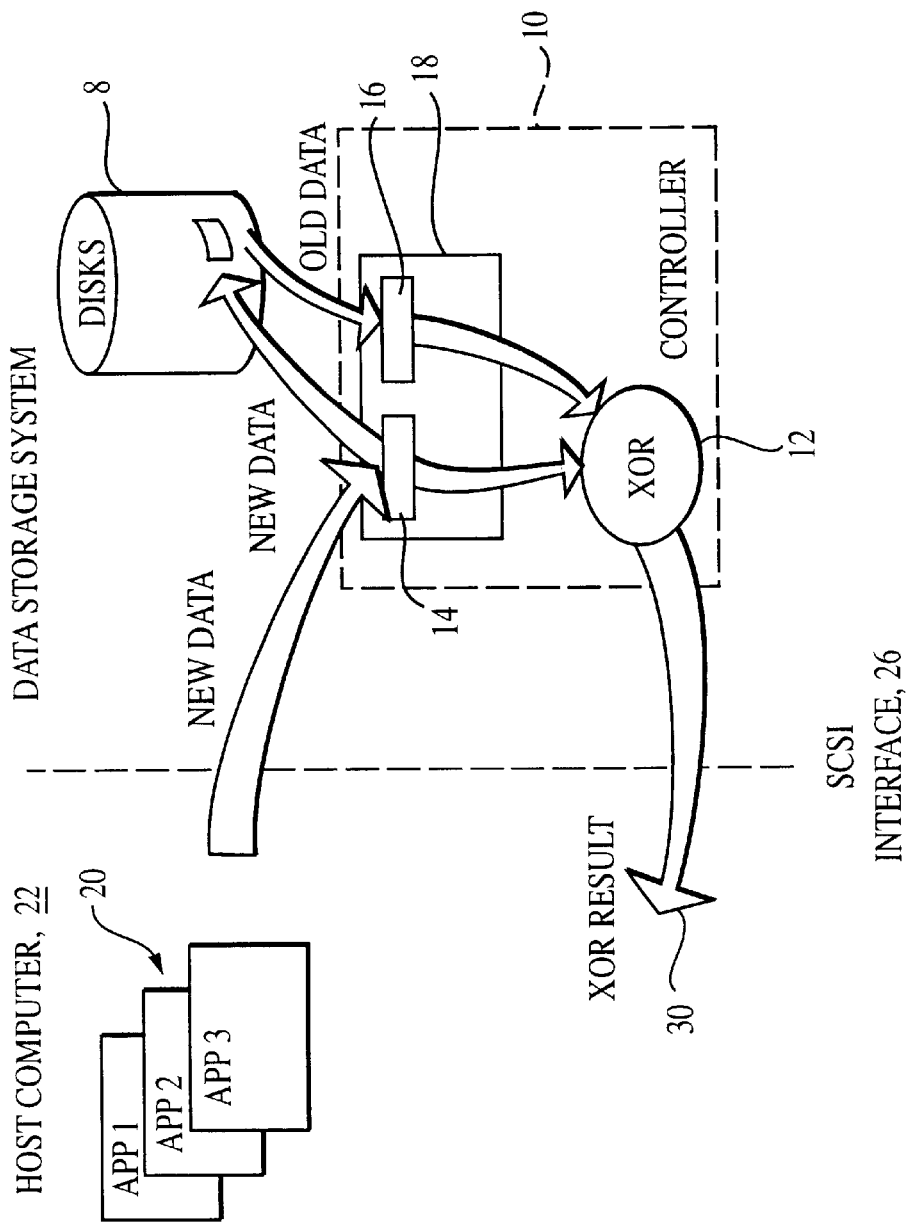
FIG. 1 is a block diagram of the data flows involved in the new lock mechanism.

The described embodiment uses the XOR (exclusive OR) capabilities of an XOR enabled drive. Referring to FIG. 1, XOR enabled drives, sometimes also referred to as RAID drives, like many conventional drives, include a storage medium (e.g. one or more disks 8) and a drive controller 10, which directs the storage and retrieval of data to and from the storage medium. The RAID drives are typically used to generate parity data for RAID type data storage systems. Within the drive controller 10 of an XOR drive, there is an XOR engine 12 which performs an XOR operation on data that is stored in two buffers 14 and 16 within a local memory 18 (e.g. RAM) that is also located within the drive.

One or more applications 20 running on a host computer 22 communicate with the drive through an interface 26, e.g. a SCSI interface 26. The semaphores or locks which are used by the applications to control access to a shared resource are stored in the disk drive. The shared resource can be virtually any resource that can be shared by applications including, for example, a peripheral device such as a printer or memory within the data storage device itself. The semaphore for a given resource is stored as the first byte in a corresponding block of data on the disk. Thus, if there are multiple shared resources that are being controlled, there will be multiple blocks of data within the disk drive, one for each resource, that are used to support the required locks.

An application obtains a lock on a given resource through use of a special lock command which has been defined for XOR drives and which causes the disk drive to perform a set of operations one of which is the exclusive OR operation of the XOR engine within the disk drive. The special lock command identifies the address of the block containing the lock (e.g. specified as a block number) and instructs the drive to write new data (e.g. a value of one) to the first byte of that location in an attempt to set a lock for itself. In response to receiving such a command, the drive controller 10 retrieves into buffer memory 16 the old data stored at the specified address on the disk and it stores the new data in another buffer memory 14. Then, the XOR engine 12 performs an exclusive OR operation on the new data and the old data to generate an XOR result 30. After generating the XOR result, the drive writes the new data to the disk at the specified block replacing the old data that was stored there, and then it passes the generated XOR result back through the interface 26 to the appropriate one of the applications 20. If the XOR result is a one, that indicates the application has obtained a lock on the resource. If the XOR result is a zero, that indicates the application failed to obtain a lock because the resource was already reserved by another application. Stated differently, if the application running on the host computer gets a one back, it is permitted to access the resource; whereas, if it gets a zero back it is prohibited from accessing the resource. It is up to the applications to honor the locking rules and to not attempt to access a resource for which it has not obtained a lock.

When the application has completed its operation involving the resource, it releases the lock by simply writing a zero to the first byte of the corresponding block on the disk using a normal write operation.

It should be understood that one need not use an entire block to store the lock information. A block is used in the described embodiment for the reason that many drives access data on the disks in units of blocks (e.g. 128 to 496 bits) and typically they are not designed to access smaller units of data. If the drive is capable of accessing data in smaller units, then, of course, a smaller portion of storage may be used to store the lock.

The following description presents two examples of the sequence of events which take place when an application attempts to get a lock for a shared resource. In the first example, illustrated by the table shown in FIG. 2a, it is assumed that the resource is free (i.e., no other entity holds a lock). In the second example, illustrated by the table in FIG. 2b, it is assumed that the resource is not free (i.e., another entity holds a lock on it). As will be shown below, if an application tries to set a lock on a resource that is free, it will get a one back. If the application tries to set a lock on a resource that is not free, it will get a zero back.

The tables of FIGS. 2a and 2b show the progress of the system through five states beginning at state zero before the request for the lock is made. There are five columns in each table. The first column identifies the state, the second column identifies the data stored on disk, the third column identifies the new data stored in one buffer, the fourth column identifies the old data in another buffer, and the fifth column identifies the result of the XOR operation that is performed.

Referring to FIG. 2a, in the first example, since the resource is assumed to be free, the first byte of the corresponding block of data on the disk contains a zero value (state 0). The application, using the special lock command, requests a lock on the shared resource by instructing the drive to write a one (i.e., new data) to the first byte of the disk block that corresponds to that resource (e.g. block m) (state 1). The drive responds by writing the new data to one buffer and then loads the zero stored in the first byte of block m (i.e., the old data) into another buffer (state 2). With the data in the two buffers, the XOR engine in the drive performs an exclusive OR operation on the contents of the two buffers to generate the "data returned" result (state 3). In this case, since the new data in one buffer was a one and the old data in the other buffer was a zero, the XOR operation on these two values produces a one as the "data returned" result. Finally, the drive writes the new data to the corresponding block on disk, replacing the old data with the new data, and it then sends the "data returned" result to the application (state 4). The corresponding block on disk now holds a one in its first byte, indicating that the resource now has a lock on the corresponding resource. And the application receives a one in response to its lock command, indicating that it has obtained the lock and can access the resource.

Referring to FIG. 2b, in the second example, since the resource is assumed to be allocated, the first byte of the corresponding block of data on the disk contains a one value (state 0). Again using the special lock command, the application requests a lock on the shared resource by instructing the drive to write a one (i.e., new data) to the first byte of the disk block that corresponds to that resource (state 1). As before, the drive responds by writing the new data to one buffer and then loads the old data stored on disk (i.e., the one stored in the first byte of block m) into another buffer (state 2). The XOR engine then performs an exclusive OR operation on the contents of the two buffers to generate the "data returned" result (state 3). In this case, since both the new data in one buffer and the old data in the other buffer are both ones, the XOR operation on these two values produces a zero as the "data returned" result. Finally, the drive writes the new data to the corresponding block on disk, replacing the old data with the new data, and it sends the "data returned" result to the application (state 4). Since the drive wrote a one to disk where a one was previously stored, the data on disk does not change and it continues to indicate that the resource has a lock on the corresponding resource. In this example, however, the application receives a zero in response to its lock command, indicating that it has failed to obtain the lock.

The lock command causes the drive to execute a routine that implements the functionality described above in connection with FIGS. 2a and 2b. That routine may be partly or fully implemented in microcode within the drive controller or it may be implemented in software or even through dedicated hardware.

Figure 3:
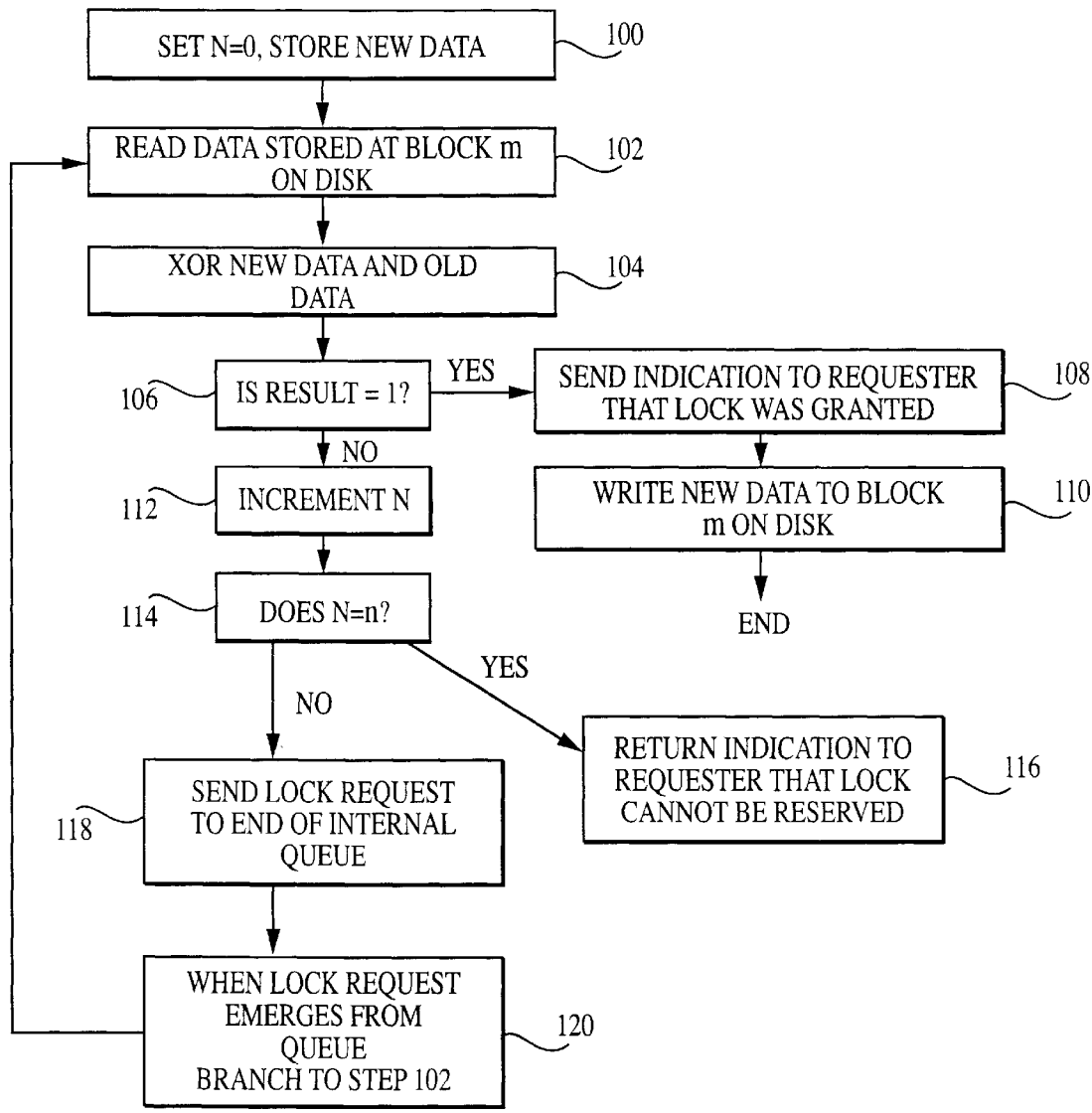
FIG. 3 is a flow chart of the task that is executed in the data storage system in response to receiving a lock request from a host computer.

In a further refinement illustrated by the flow chart of FIG. 3, the lock command, in addition to passing a start block number, m, also passes a block count value, n, to the drive. The drives responds to the lock command by repeating its request for a lock until one is granted or until the number of requests finally equals the block count, whichever occurs first. More specifically, the drive controller performs the following steps. Upon receiving the lock command, the drive sets an internal counter (N) to zero and it stores the new data (i.e., a block of data with the first byte having a value of one) in a local buffer (step 100).

As described previously, the controller also loads the old data stored on the disk at block m into another buffer (step 102). Then the XOR engine performs an exclusive OR operation on the new data and the old data to generate a result (step 104). It checks the result to determine whether the lock was obtained (step 106). If the value of the first byte in the XOR result is one, indicating the lock was obtained, the drive sends an indication of success to the requester (step 108) and writes the new data to the disk at block location m (step 110). On the other hand, if the first byte has value zero, indicating the lock was not obtained, the drive increments N by one (step 112) and then checks if the value of N equals n, the block count supplied by the lock command (step 114). If N is less than n, the drive adds the lock request to an internal queue (assuming, of course, that the internal queuing in the drive has been enabled) where it is held for subsequent execution (step 118). The drive continues to process the other I/O commands that have been stored in the internal queue, and when the queued lock command finally emerges from the internal queue, the drive loops back to step 102 and then repeats the above-described sequence of steps either until the lock is obtained or until N=n (step 120).

When N=n, the drive stops polling for a lock and returns an indication to the requester that a lock cannot be reserved (step 116).

In summary, the host computer makes a call into the controller, which invokes a lock request routine. That routine, once invoked, performs the polling function in an attempt to get a lock. If it gets the lock within a specified number of attempts it returns an indication of success. If it does not succeed within that specified number of attempts, it returns an indication of no success.

Note that the contents of the remainder of the data block is not of central importance. One could, however, use the available space to store the id of the application which obtained the lock.

In the described embodiment, this command is implemented through an overloaded SCSI command. A number of different SCSI commands may be overloaded to invoke the functionality within the drive associated with the lock mechanism. For example, the SCSI standard specifies a group of commands which enable a user to include user-specified (or vendor-specific) features. Examples of such commands include READ BUFFER, WRITE BUFFER, SEND DIAGNOSTIC, and RECEIVE DIAGNOSTIC RESULTS. According to the SCSI standard, the first three of these commands are optional commands, which means that a vendor which implements the standard need not support them. The last command is mandatory.

The described embodiment overloads the WRITE BUFFER command. In general, the WRITE BUFFER and the READ BUFFER commands are provided in the SCSI protocol to serve a diagnostic function for testing target memory and the SCSI bus integrity. But both commands also allow the user flexibility in defining other functionality for the command.

The command descriptor block (CDB) for the WRITE BUFFER command is shown in FIG. 4. The CDB is a 10 byte block. The opcode for the WRITE BUFFER command is 3 Bh.

In the CDB, the logical unit number identifying the target is stored in the top three bits of byte 1 and the mode is specified in the mode field which occupies the bottom three bits of byte 1. The entry in the mode field identifies the function of the command and the meaning of the fields within the command. Among the modes defined for this command are the following:

| Mode | Description | Type |
| --- | --- | --- |
| 000b | Combined header and data | Optional |
| 001b | Vendor-specific | Vendor specific |
| 010b | Data | Optional |
| 011b | Descriptor | Optional |
| 100b | Reserved | Reserved |
| 101b | Reserved | Reserved |
| 110b | Reserved | Reserved |
| 111b | Reserved | Reserved |

In the described embodiment, specifying 001b in the mode field identifies this command to the driver in the data storage system as a special or overloaded command. The precise identity of the command is specified in the buffer id field which is byte 2 of the CDB. In other words, this approach allows for the possibility of defining a set of special commands, one of which (i.e., a byte 2 entry of 2) is the special lock request command. If the command is a special command, the remainder of the CDB for the WRITE BUFFER command specifies block, the bock count, and the length of the data that will follow in the subsequent data phase. During the following data out phase, the host computer sends a one which is to be written to the specified block in the drive.

The overloaded SCSI command represents an atomic operation within the drive, i.e., a set of operations which must be completed to request a lock. When the controller within the drive receives the special SCSI command, it invokes the appropriate task to perform the functions associated with the command. Those functions are generally as described above.

In the described embodiment, the SCSI command has two data phases, namely, a data out phase during which the new data is sent to the drive and a data in phase during which the results are returned to the application. Alternatively, the second data phase can be eliminated by using the status phase of the SCSI command to report on the success or failure of the lock request.

It should be noted that one advantage of storing the semaphores or locks on a disk is that those locks are persistent, i.e., they will survive power failures and inadvertent shut downs or crashes. However, there is also a downside, namely, the locks will persist even after the application or process that holds the lock has crashed or disappeared. It is therefore desirable to provide a mechanism for clearing locks associated with an application or process that has gone away before it has released its locks. This can be accomplished in a number of ways. One approach is to require the application or process to provide heartbeats to the data storage system showing that it is still alive. If the heartbeats stop or are not received, the data storage system will respond by releasing the locks that were held by that application. Another possibility is to provide a separate process which monitors all processes and/or applications that hold locks. If it detects that any of those applications has gone away without releasing its lock, it will automatically release the locks for that application.

The invention is meant to cover all of the above-mentioned alternative approaches as well as others not specifically mentioned. The above-mentioned embodiments and others are within the following claims.

What is claimed is:

1. A method of providing a lock to a requester, said method comprising:

storing a lock indicator at a storage location on a storage medium;

receiving a lock command from a requestor on a host computer, wherein the lock command identifies the storage location on the storage medium and contains a lock request;

in response to receiving the lock command, retrieving the lock indicator from the storage medium;

performing an exclusive OR operation on the lock request and the retrieved lock indicator to produce a lock request result; and writing the lock request to said storage location in said storage medium.

2. The method of claim 1 further comprising:

in response to receiving the lock command, repeatedly polling the storage location on said storage medium for an indication that the lock request was granted.

3. The method of claim 2 upon detecting in said storage location said indication that the lock request was granted, sending an accept notification to the host computer indicating that the lock request was granted.

4. The method of claim 2 if after an elapsed period of polling, said indication that the lock request was granted is not detected, sending a reject notification to the host computer that the lock request was not granted.

5. The method of claim 4 the elapsed period is equal to a predetermined number of polls of the storage location.

6. The method of claim 1 further comprising sending a notification back to the host computer indicating whether the lock request was granted.

7. The method of claim 6 wherein the notification is the lock request result.

8. A data storage device configured to provide to an application that is running on a host computer connected to the data storage device a global locking mechanism for a resource, said device comprising;

data storage medium which during use stores a lock indicator for said resource;

means for receiving a lock command from the host computer, said lock command containing a lock request;

means for generating a lock request result in response to the lock command, said generating means comprising logic for performing an exclusive OR operation on the lock request and the lock indicator to produce said lock request result; and means for writing the lock request to said storage location in said storage medium.

9. The data storage device of claim 8 wherein the generating means further comprises means for retrieving the lock indicator from the data storage medium.

10. The data storage device of claim 9 wherein the generating means further comprises means for repeatedly performing a polling cycle during which generation means first retrieves the lock indicator and then performs the exclusive OR operation.

11. The data storage device of claim 10 wherein the lock command includes an address of a storage location and wherein the generating means further comprises a means for retrieving the lock indicator from said storage location.

12. The data storage device of claim 10 wherein the lock command includes a count parameter and wherein the polling means repeatedly performs the polling cycle until either the lock request result indicates that the lock has been granted or until the number of cycles equals said count parameter at which time the sending means is caused to send the lock request result to the host computer.

13. The data storage device of claim 8 further comprising means for sending a notification back to the host computer indicating whether the lock request was granted.

* * * * *